April 14, 1970     F. S. D'AVELLO ET AL     3,506,514

METHOD OF BUILDING PLIES AND TIRES

Original Filed Dec. 23, 1963     2 Sheets-Sheet 1

INVENTOR.
FAUST S. D'AVELLO
BY DONALD J. EVES

ATTORNEY

April 14, 1970   F. S. D'AVELLO ET AL   3,506,514
METHOD OF BUILDING PLIES AND TIRES
Original Filed Dec. 23, 1963   2 Sheets-Sheet 2

INVENTOR.
FAUST S. D'AVELLO
BY DONALD J. EVES

J. B. Holden
ATTORNEY

United States Patent Office 3,506,514
Patented Apr. 14, 1970

3,506,514
METHOD OF BUILDING PLIES AND TIRES
Faust S. D'Avello, Akron, and Donald J. Eves, Mogadore, Ohio, assignors to The Goodyear Tire & Rubber Company, Akron, Ohio, a corporation of Ohio
Continuation of application Ser. No. 332,657, Dec. 23, 1963. This application July 25, 1968, Ser. No. 754,158
Int. Cl. B29h *17/38, 17/24;* B32b *27/40*
U.S. Cl. 156—132                                8 Claims

ABSTRACT OF THE DISCLOSURE

A method of building a pneumatic tire containing fabric reinforcement by applying a liquid material reactable to give a coating on a tire building form, placing a fabric member thereon to give a tubular member, applying at least one other coat of liquid material reactable to give a cured elastomer, placing bead rings on the building form and inflating the building form to give the tire the desired shape when it is cured, the preferred liquid material reactable to give a cured elastomer being a polyurethane reaction mixture.

---

This application is the continuation of application, Ser. No. 332,657 filed June 23, 1963 now abandoned.

This invention relates to methods of making plies which are useful in the manufacture of pneumatic tires. In a broader aspect this invention relates to a method of making pneumatic tires which contain plies which function as breaker strips or as reinforcements for the tire body or the plies may be used as body plies extending from bead to bead of the tire.

The nature of this invention may be more readily understood by reference to the drawings wherein FIG. 1 is a cross section through a rotatable and inflatable and collapsible tire building form.

Figure 1:
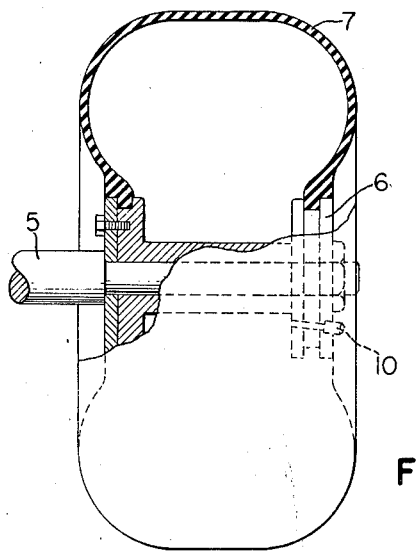
Figure 2:
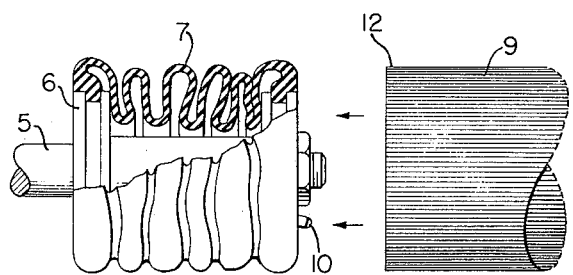
FIG. 2 is a view in elevation in partial section of the building form of FIG. 1 in the collapsed state showing a tubular fabric member in position to be placed axially on the building form.
Figure 3:
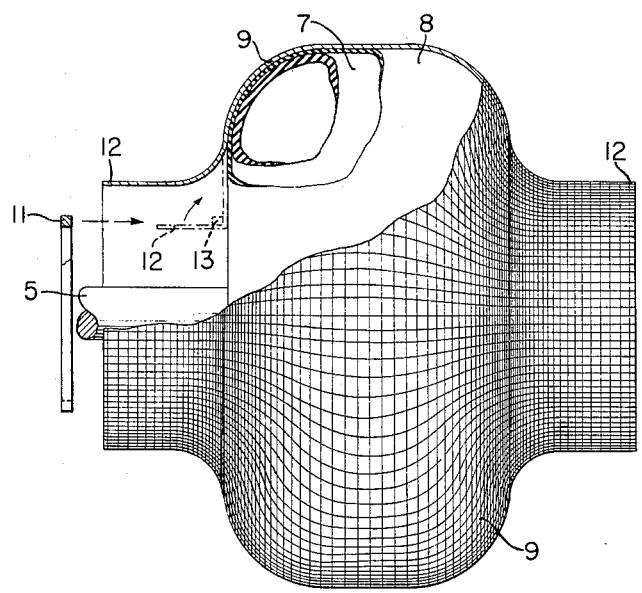
FIG. 3 shows the inflated building mold of FIG. 1 having a coat of a liquid material reactable to form a cured elastomer in contact with the building form with the fabric tubular member positioned axially over the building form.

Referring to FIG. 1, the numeral 5 represents an axle having connection with a rotating means (not shown). Numeral 6 represents a wheel positioned on the axle 5 and having an inflatable pneumatic building form 7 mounted on said wheel. It is preferred that the inflatable building form 7 may be made of a material which inherently does not adhere to the liquid material which is reactable to yield a cured elastomer. Alternately, a suitable releasing agent may be coated on or incorporated in the building form 7. Suitable releasing agents are the polyolefins such as polyethylene or polypropylene or the polyvinyl alcohols when the liquid material which is reactable to yield a cured elastomer is a liquid polyurethane reaction mixture. Once the building form 7 is inflated a coating of the liquid material reactable to give a cured elastomer is applied to the surface of a building form to give a coating 8 of the desired thickness, then this coating of liquid material is cured or partially cured. Also, it should be noted that it may be desired to apply several coats of the liquid material which is curable to yield elastomer prior to placing the fabric tubular member 9 axially over the building form. In practice, it has been found preferable to collapse the building form as shown in FIG. 2 prior to placing the tubular fabric member 9 axially over the building form. Normally, the tubular fabric member is pre-cut to dimensions of the tire to be built. Alternately, the tubular member may be placed on the collapsed building form 7 which has a vacuum thereon. Then the tubular member may be cut by the tire builder to give the fabric reinforcement for a tire having the dimensions desired with the tubular member 9 being positioned on the tire building form 7 as best seen in FIG. 3.

Figure 4:
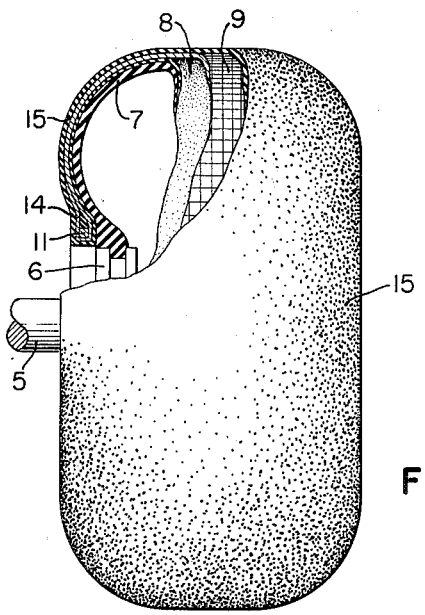
FIG. 4 is a partial elevation view of the finished tire on the building form.

The building form 7 is reinflated by means of an air hose attached to the valve 10. Inflation of the building form 7 with the tubular member thereon causes the tubular member to take the shape shown best in FIG. 3. The bead rings 11 may be placed over the end 12 of the tubular fabric and pressed down to the position shown in dotted line 13. Then the ends of the tubular fabric are turned up to form the bead section 14 shown best in FIG. 4. With the bead rings placed on the tire and the ends having the fabric members turned up as shown in FIG. 4, then additional coats 15 of the liquid material which is curable to yield a cured elastomer may be applied over the fabric. It should be obvious that if more fabric members are desired they may be applied with or without additional coats of the liquid material which is reactable to yield a cured elastomer being applied between each tubular fabric member. When the last coating of the liquid material which is curable to yield a cured elastomer is applied to the building form, then the material is allowed to react and cure to give a finished tire such as that shown in FIG. 4. The finished tire may be removed from the building form 7 by collapsing the building form. With the building form collapsed in the manner shown in FIG. 2 the tire may be readily removed from the building form where the building form contains or has been treated with a suitable releasing agent.

Figure 5:
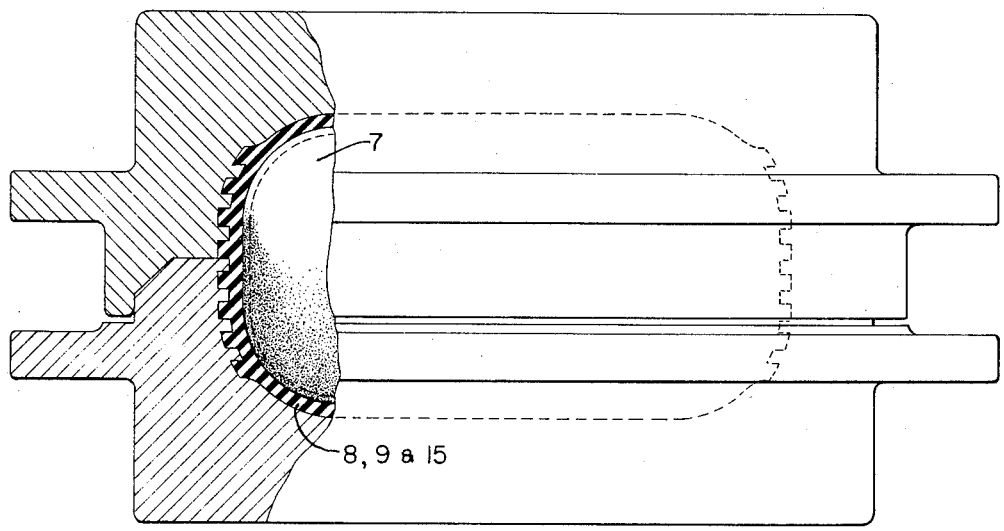
FIG. 5 is a view in elevation of the tire inside a curing mold.
Figure 6:
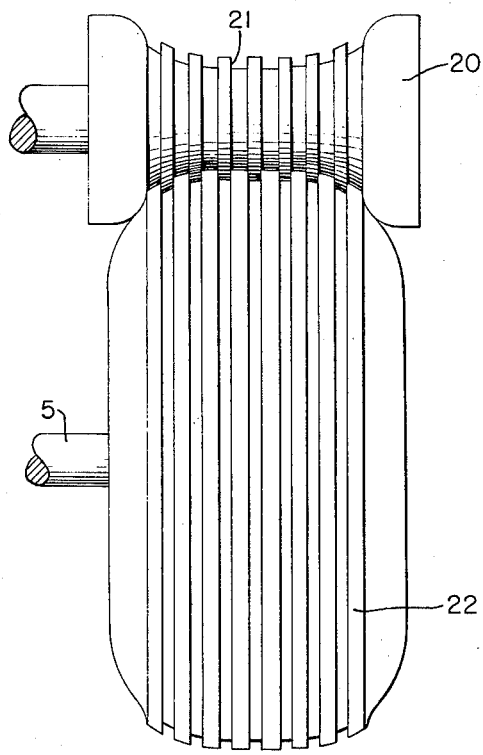
FIG. 6 is a view in elevation of the tire on an inflatable and collapsible tire building form with a tread imparting roll positioned in contact with the tread area of the tire.

Alternately, after the last coat of polyurethane has been applied to the tire, it may be placed inside a mold as shown in FIG. 5 and the air pressure on the building form increased to expand the tire within the curing mold to force the liquid polyurethane reaction mixture to flow into the cavities of the mold to give the cured tire the desired tread pattern. Then the tire is allowed to remain in the mold at a temperature from about 75° F. to about 300° F. for the desired time to achieve the desired cure, normally from 1 up to about 10 hours and in some instances longer, depending on the temperature and the cross-linking material used. When the liquid polyurethane reaction mixture is cured the mold is open and the tire is removed from the mold and the building form is collapsed to permit the tire to be removed from the building form.

In another construction the tread design may be put on the tire by use of a tread imparting roll 20 which may have the desired tread transfer area 21 embossed into the tread imparting roll surface. After the fabric sleeve has been placed over the collapsed building form and it has been reinflated and sufficient coats of polyurethane have been applied to give the desired thickness to the tire carcass, the tread area may be built up by applying additional coats of polyurethane to build up the tread area. The desired tread pattern is transferred to the tire by the tire tread imparting roll 20 which is moved into contact with the tire tread surface 22. Hence, as the building form rotates beneath the tread imparting roll the liquid polyurethane mixture is impressed with the desired tread design by the squeezing action of the roll on viscous polyurethane mixture. Where the cross-linking agent used in preparing the liquid polyurethane reaction mixture is of the fast diamine type, the tread can be imparted in this manner and have fairly distinct and sharp outlines in the tread grooves without the need to cure the tire at elevated temperature.

The building form should be coated with a suitable releasing agent for the liquid materials reactable to give a cured elastomer. Release agents for rubber molded goods are well known and widely used so any of these can be chosen for use with the appropriate cured elastomer obtained. For instance, when using a liquid polyurethane reaction mixture the silicone fluids, waxes, polyethylene and polyvinyl alcohols may be used to coat the building form to keep the cured elastomer from sticking to the building form. The liquid materials reactable to give a cured elastomer are well known and broadly are referred to as the reactive end group rubbers. Representative examples of these materials are the mixtures of the liquid thiol terminated hydrocarbon sulfur copolymers and organic polyamines or polyepoxy compounds or the better known liquid polyurethane reaction mixtures, which in a preferred aspect of this invention, are applied by a spray coating operation.

The spray coating polyurethane compositions useful in this invention comprise a liquid reaction mixture of (1) a mixture of an organic polyisocyanate and a reactive hydrogen containing polymeric material such as the polyesters, polyesteramides and polyethers dissolved in sufficient solvent to yield a sprayable mixture and preferably prereacted to form a prepolymer, and (2) sufficient crosslinking agent to react with the free polyisocyanate. Normally, this spray coating polyurethane composition should contain from about 40 to 65% solids or even more. Where the solid content of the spray composition is very low the individual spray coats will be thinner and the amount of solvent to be disposed of or recovered will be larger than with a higher solid content spray composition. About 55% and even higher solid content spray compositions are desired so long as the solid content is not too high to prevent uniform coating of the form or a tendency to flow. Preferably the solid content should be 60 to 85% if the mixture is still sprayable at this solid content. As indicated above, the thickness of each spray coat is to a certain extent determined by the solid content of the spray. Also the solid content of the spray effects the solvent pollution problem in the spraying area, therefore it is desirable that the solid content of the spray composition be adjusted to give a spray coat of about 5 to about 10 mils in thickness. Where the coating thickness per spray pass exceeds about 10 mils the coating frequently exhibits a tendency to sag or flow instead of going on as a satin smooth film that is customarily obtained and desired.

Any of the polyesters, polyesteramides and polyethers suitable for making polyurethane castings may be used either as is or by suitable modifications to prepare the spray coating polyurethane compositions of this invention. In general the polyesters are preferred over the polyethers for the preparation of these spray coating polyurethane compositions. This preference is based primarily upon the fact the polyesters produce coatings of greater strength and solvent resistance than the polyethers.

Representatives examples of the polyesters useful in this invention are the condensation products of a glycol with an organic dicarboxylic acid or anhydride having a molecular weight of about 700 to 5000 and preferably from 1000 to 3000. Representative glycols are ethylene, propylene, butylene, pentylene, decamethylene, etc. Representative examples of the organic dicarboxylic acids or anhydrides are succinic, glutaric, adipic, phthalic, terephthalic, isophthalic, suberic, sebacic, pimelic, and azelaic. Also, small amounts, i.e., 1 to 20% or more, of certain tri- or higher functional polyols and acids can be used to produce a small amount of branching in the polymeric material. Castor oil may be used in small amounts, too.

The prepolymers of this invention may be prepared from reactive hydrogen containing polymeric materials (hereinafter sometimes referred to in a more restricted sense as polymeric glycols or polyols) and an organic polyisocyanate by the procedures well known to the art. Any of a wide variety of polymeric glycols having a molecular weight of from 700 to 10,000 may be used. Of the polymers prepared from polyalkylene ether glycols, the polytetramethylene ether glycols are preferred. It is to be understood that other polyols such as polyalkylenearylene ether glycols or triols, polyalkylene ether-thioether glycols or triols and polyester glycols, including alkyd resins, may be used.

In the preparation of the isocyanate-terminated polymers, a molar excess of a polymeric polyol such as a polyalkylene ether glycol or polyester glycol are first reacted with an organic diisocyanate to prepare a polyurethane glycol which may subsequently be reacted with a molar excess of an organicdiisocyanate so as to prepare an isocyanate-terminated polymer. Alternatively, the polymeric glycol may be reacted directly with a molar excess of an organic diisocyanate. In the preparation of these polymers, overall molar ratios of organic diisocyanate to polymeric polyol of between 1.1:1 and 12:1 should be used at temperatures ranging from about 20 to about 150° C. The preferred ratios are about 1.2:1 to 2:1.

Any of a wide variety of organic diisocyanates may be employed for the preparation of the isocyanate-terminated polymer, including aromatic, aliphatic and cycloaliphatic diisocyanates and combinations of these types. Representative compounds include toluene-2,4-diisocyanate; mixtures of toluene-2,4- and -2,6-diisocyanates; m-phenylene diisocyanate; 4-chloro - 1,3 - phenylene diisocyanate; 4,4'-biphenylene diisocyanate; 1,5 - naphthylene diisocyanate; 1,4-tetramethylene diisocyanate; 1,6-hexamethylene diisocyanate; 1,10-decamethylene diisocyanate; 1,4-cyclohexylene diisocyanate; 4,4' - methylene - bis(cyclohexyl isocyanate) and 1,5-tetrahydronaphthylene diisocyanate. For purposes of the present invention, the toluene-diisocyanates; diphenylmethane-4,4'-diisocyanate and 3,3'-dimethyl-4,4'-bis-phenylene diisocyanate are preferred and these respective diisocyanates are sometimes hereinafter referred for convenience as TDI, MDI and TODI.

These prepolymers are dissolved or dispersed in suitable solvents hereinafter described and then are mixed with a crosslinking agent which preferably is dissolved or dispersed in a suitable solvent. The amount of solvent used for preparing the dispersion of the prepolymer or mixtures of polymeric polyols and polyisocyanate and the crosslinking agent are determined primarily by the viscosity desired in the mixture and the nature of the spraying equipment in which the mixture is to be used. If high pressure spray equipment is used, the amount of solvent required may be less as higher viscosities can be tolerated. Hence, the solid content of the reaction mixture may be very high and contain only a few percent solvent.

The crosslinking agent may be a material containing three or more reactive groups, e.g. glycerol or triethanolamine, but bifunctional materials are preferred. In general, the bifunctional materials yield products having superior spraying properties. Representative classes of compounds suitable for use as crosslinking agents are the glycols, the diamines having primary or secondary amino groups, the dicarboxylic acids, the hydroxy amines, the hydroxy-carboxylic-acids and the aminocarboxylic acids. Representative examples of suitable compounds belonging to these classes are ethylene glycol; 1,3-propane-diol; 1,4-butane-diol; ethylene diamine; trimethylene diamine; tetramethylene diamine; m-phenylene diamine; o- and m-dichloro-benzidine; 2,5-dichloro-phenylene diamine; 3,3'-dichloro-4,4'-diamine-diphenyl methane; dianisidine; 4,4'-diamino-diphenyl-methane; naphthylene diamines; tolylene-2,4-diamine; p-amino-benzyl aniline; o- or p-aminodiphenyl-amine; 2 - aminoethyl alcohol; 2-amino-1-naphthol; m-aminophenol; glycollic acid; alpha-hydroxy propionic acid; amino acetic acid and amino benzoic acid. The preferred glycol crosslinker is butane diol and the chloroamines such as ortho dichlorobenzidine and methylene bis orthochloroaniline are the preferred amine crosslinkers. The respective chloroamines above are sometimes referred to herein for convenience as ODCB and MOCA.

A method for selecting the diisocyanates and diamines which form sprayable liquid reaction mixtures that can be mixed and used with a single container-type spray gun is the boiling methylene chloride turbidity test. By this method semimolar solutions of the diisocyanate and diamine are made with methylene chloride. The respective methylene chloride solutions of diisocyanate and diamine are raised to the boiling temperature and mixed. If a turbidity develops inside of 25 to 30 seconds, this combination of diisocyanate and diamine yields a reaction mixture which can be sprayed under special conditions, but it is not necessary to use elevated temperatures to achieve the desired cured physicals. Some of the special spray conditions are, for instance, very low temperature or a two-component feed spray gun containing a mixing head. On the other hand, those mixtures of diisocyanate and diamine which do not produce a turbidity inside of about 25 to 50 seconds can be sprayed with normal spray conditions. Some combinations especially well suited for use in this invention are

| | |
|---|---|
| TDI—MOCA | TODI—ODCB |
| TDI—ODCB | TODI—APS |
| TDI—APS [1] | MDI—MOCA |
| TODI—MOCA | MDI—ODCB |
| Naphthalene diisocyanate—MOCA | |
| Naphthalene diisocyanate—ODCB | |
| Naphthalene diisocyanate—APS | |
| 4,4'-diphenyl diisocyanate—MOCA | |
| 4,4'-diphenyl diisocyanate—ODCB | |
| 4,4'-diphenyl diisocyanate—APS | |

The aromatic diamines useful in this invention are used in the amount of about 0.2 to 0.9 mol per mol of excess organic polyisocyanate over that equivalent to the polyester. Preferred results are obtained when the amount of aromatic diamine is about 0.5 to 0.8 mol based on the excess organic polyisocyanate.

Representative examples of suitable aromatic diamines useful in this invention are 4,4'-diaminodiphenyl methane (MDA); 3,3'-dimethyl - 4,4' - diamino diphenyl methane (DMMDA); 2,4-tolylene diamine (2,4-TDS); o-dianisidine (DADA); and o-tolidine (TODA).

Any of the non-reactive solvents normally used in making paints which are suitable for spraying may be used in this invention. Representative examples of these are benzene, toluene, the paraffinc naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, nitropropane, nitroethane, etc. Mixtures of certain solvents in particular amounts may be desirable to obtain satisfactory spreading properties and evaporation rates when the polyurethane spray composition is applied to a surface. This is especially true where very volatile solvents such as benzene and acetone are used.

Also it is desirable to add to the spray composition certain pigments and other additives such as surface active agents, leveling agents, for instance, cellulose acetate butyrate, and other additives well known to the spray coating art. In particular, it is desirable to add about 0.5 to 5 parts and preferably about 1 to 2 parts of a pigment such as carbon black or other dark pigment on a hundred parts of prepolymer basis to increase the ultraviolet resistance and to comply with government regulations in regard to the coloring of liquid fuel cells for aircraft.

The addition of from 1 to about 30 parts of a leveling agent per hundred parts of prepolymer to the solvent or the solvent mixture of the prepolymer or the solvent mixture of the crosslinking agent results in the sprayed surface having a satin smooth finish. The addition of a leveling agent also results in the sprayed surface being free of peaks or projections that cause the finished article to contain pinholes. Where the sprayed cost is not satin smooth and contains peaks and projections, holes are frequently obtained in the first spray coat and even sometimes in the finished liquid container when it is stripped from the building form. These holes have to be patched and frequently result in the complete rejection of an otherwise satisfactory fuel cell.

Submicroscopic pyrogenic silica such as prepared in a hot gaseous environment by the vapor phase hydrolysis of silicon tetrachloride and available from Godfrey L. Cabot, Inc. under the trademark CAB-O-SIL is especially useful as a leveling agent in the sprayable polyurethane compositions when used in about 0.1 to 10 parts per 100 parts of solids in the solution. The preferred amount is about 0.5 to about 4 parts as the amount of solvent needed to give a sprayable viscosity is not materially changed. Also, this range of pyrogenic silica gives good thixotropic properties to the resulting sprayable composition.

The preferred fabric is an expansible knit tube or sleeve. The fabric may be of the polyester, polyamide, polyurethane, rayon, cotton, glass and other fibrous material.

In order to further describe the invention, several embodiments thereof are set forth with respect thereto. However, it should be understood that such embodiments are set forth for illustrative and not limitative purposes. All parts are by weight unless otherwise designated.

EXAMPLE I

A pneumatic tire was built as follows: the building form 7 was inflated to about 5 pounds pressure and given a spray coat of a paraffin wax or polyethylene. Then two coats of a liquid polyurethane reaction mixture was applied to the form 7 by spraying, although it could have been applied by dip coating or brushing. Then a vacuum of about 27 inches of water was pulled on the building form 7 to collapse the form to permit the expansible knitted tubular fabric to be placed axially over the collapsed building form 7. With the tubular fabric in place, the building form was reinflated to about 5 pounds per square inch with air before an additional coat of polyurethane was applied. Before the additional coat of polyurethane was applied, bead rings were placed in position on the tire and the ends of tubular members were turned up and stitched down to form the tire bead. With sufficient coats of polyurethane in place the tire may be cured by allowing the tire to remain on the building form a sufficient time at room temperature or it preferably is placed in a heated area at about 250° F. for about 1 to 6 hours before removing the cured tire from the collapsed building form.

The polyurethane liquid reaction mixture used in this example was prepared from a prepolymer. This prepolymer was prepared by reacting 2 mols of toluene diisocyanate with 1 mol of a polyester prepared by the condensation of adipic acid with an excess of a mixture consisting of 80% by weight ethylene glycol and 20% by weight propylene glycol. This prepolymer was used to prepare a black masterbatch by ball milling 1250 parts of this prepolymer with 375 parts cellosolve acetate, 125 parts carbon black and 375 parts of methyl ethyl ---
[1] APS is bis(3,3'-aminophenyl) sulfone.

ketone. The ball milling was continued until a uniform suspension was obtained.

Component 1 of the spray mixture was formed by mixing 165 parts of this black masterbatch with a mixture consisting of 1500 parts of the prepolymer, 450 parts Cellosolve acetate, 450 parts methyl ethyl ketone and 72 parts of a solution of cellulose acetate butyrate containing 10% by weight of a mixture containing 50% xylene and 50% methyl cellosolve acetate. Component 2 of this sprayable mixture comprises 153 parts of methylene-bis-ortho-chloroaniline and 153 parts of methyl ethyl ketone. Components 1 and 2 were mixed just prior to the time the spray coats were to be applied to form the sprayable polyurethane liquid reaction mixture. Normally the mixture of components 1 and 2 remained sprayable in excess of one hour.

EXAMPLE II

Another two-component spray recipe satisfactory for making tires in accordance with the procedure of Example I is given below:

COMPONENT #1

| Ingredient: | Parts |
|---|---|
| Prepolymer | 63 |
| Cellosolve acetate | 18.5 |
| Methyl ethyl ketone | 18.5 |
| Cellulose acetate butyrate | 0.4 |
| Lampblack | 1.0 |

COMPONENT #2

| Ingredient: | Parts |
|---|---|
| Diamine | 1 |
| Methyl ethyl ketone | 1 |

The following prepolymers were used in the formulation of Component #1 of this example:

Prepolymer A

A reaction product of 2 mols of tolylene diisocyanate with about 1 mol of a polyester formed by condensing an excess of ethylene glycol with adipic acid.

Prepolymer B

Same as Prepolymer A except the mol ratio used was 1.1 to 1.

Prepolymer C

Same as Prepolymer A except propylene glycol was used to produce the polyester.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a poly tetramethylene ether glycol having a molecular weight of about 3000.

Each of the Prepolymers A through F were used to make Component 1. Then each of these Component 1 mixes were combined with a Component 2 mix where methylene-bis-orthochloroaniline and orthodichlorobenzidine was the diamine used to make Component 2. Each of these resulting mixes of Components 1 and 2 could then be used to make a tire ply or a tire according to the procedure of Example I.

EXAMPLE III

A prepolymer was prepared from one mol of 80% ethylene 20% propylene adipate having a reactive number of 60±5 and two mols of the commercial 80/20 2,4/2,6-tolylene diisocyanate. The prepolymer had a free isocyanate content of 3.5–4.0%. A solution was prepared according to the following recipe:

| | Parts |
|---|---|
| Prepolymer | 200 |
| Cellosolve acetate | 60 |
| Methyl ethyl ketone | 60 |
| 10% solution cellulose acetate butyrate in Cellosolve acetate | 10 |

Fifty parts of the prepolymer solution at room temperature was added to 2.5 grams of 3,3'-dimethyl-4,4'-diaminodiphenylmethane which was dissolved in 10 parts of 2-nitropropane with the diamine solution being at 170° F. The mix was stirred rapidly and then poured in front of a doctor blade to draw down a film. The excess melt sets within one minute. The films become tack free within ten minutes at room temperature and exhibit no drawling or sag, the resulting film having a gauge of 0.010 inch was cured at room temperature and the curved film had the following properties:

| | |
|---|---|
| Tensile (p.s.i.) (0.010 gauge) | 6900 |
| Elongation percent | 560 |
| Modulus (p.s.i.): | |
| 100% | 1000 |
| 300% | 2000 |
| 500% | 5400 |

Masland crease test—O.K. at −90° F.

Volume change in 70/30 Isooctane/Toluene (4 days)—13.7%

The polyurethane reaction mixture above was used to make a tire in accordance with the procedure of Example I except that a tread was impressed upon the tire by rotating the building form with the tread imprinting roll in contact with the liquid polyurethane mixture that had been sprayed on the tire in the tread area. After about four coats of polyurethane the resulting tire had a fairly sharp and distinct tread area impressed into its surface and this tire did not need to be placed into an oven and heated to obtain a satisfactory cure. After about a half hour on the building form the tire was removed by collapsing of the building form and allowed to stand for two days before being placed into service.

While certain repersentative embodiments and details have been shown for the purpose of illustrating the invention, it will be apparent to those skilled in the art that various changes and modifications may be made therein without departing from the spirit or scope of the invention.

What is claimed is:
1. A method of building a pneumatic tire containing fabric reinforcement comprising the steps of
  (1) applying to a tire building form coated with a releasing agent at least one coat of a liquid material reactable to give a cured elastomer, said reaction mixture comprising an organic polyisocyanate, a reactive hydrogen containing polymeric material of about 700 to about 5000 molecular weight and a cross-linking agent selected from the class consisting of organic diamines, glycols, and hydroxylamines,
  (2) placing at least one fabric member over the tire building form to obtain at least one tubular member, and shaping the tire by inflating the building form,
  (3) placing bead rings on each end of the building form,
  (4) turning the tubular fabric member back over the bead ring to form the bead section,
  (5) applying at least one more coat of a liquid material reactable to give a cured elastomer to the tire building form,
  (6) reacting the liquid material to give a tire having the cured elastomer integrally adhered to the fabric, and
  (7) removing the tire from the building form.
2. The method of claim 1 wherein the fabric member is expansible to take the shape of a tire.

3. The method of claim 1 wherein the fabric is filamentous.

4. The method of claim 1 wherein the fabric is a metallic.

5. The method of claim 1 wherein the fabric is a polyester.

6. The method of claim 1 wherein the fabric is a polyamide.

7. The method of claim 1 wherein a tread pattern is impressed into the tread surface of the tire before the liquid material reactable to give a cured elastomer is cured by contacting the spray coating with the means to impart said tread pattern as the means and the tire move relative to each other.

8. The method of claim 1 wherein a tread pattern is impressed into the tread surface of the tire by contacting the spray coating of the liquid material at least prior to the time the liquid material is completely cured with a roller to impart a tread pattern in the tire as the roller and tire move relative to each other.

References Cited

UNITED STATES PATENTS

| | | | |
|---|---|---|---|
| Re. 24,514 | 8/1958 | Hoppe et al. | |
| 1,551,040 | 8/1925 | Marquette | 156—416 |
| 1,930,585 | 10/1933 | Corey | 152—330 |
| 2,411,659 | 11/1946 | Manning | 156—128 X |
| 2,721,811 | 10/1955 | Dacey et al. | 117—65 |
| 2,729,618 | 1/1956 | Muller | 260—75 |
| 2,779,689 | 1/1957 | Reis | 117—104 |
| 2,884,044 | 4/1959 | Hulswit et al. | 156—123 |
| 2,968,575 | 1/1961 | Mallonee | 161—190 |
| 3,183,135 | 5/1965 | Berquist | 156—126 |
| 3,345,228 | 10/1967 | Kovac et al. | 156—123 |

JOHN T. GOOLKASIAN, Primary Examiner

C. B. COSBY, Assistant Examiner

U.S. Cl. X.R.

156—133; 161—190